United States Patent

[11] 3,553,531

[72] Inventors Augusto Rimondini; Primo Foresti, Milan, Italy
[21] Appl. No. 823,049
[22] Filed May 8, 1969
[45] Patented Jan. 5, 1971
[73] Assignee Societa Italiana Telecomunicazioni Siemens S.p.A. a corporation of Italy
[32] Priority Jan. 15, 1969
[33] Italy
[31] No. 16266A/68

[54] VOLTAGE STABILIZER WITH OVERLOAD PROTECTION AND AUTOMATIC RESTORATION
10 Claims, 3 Drawing Figs.

[52] U.S. Cl. .................................................. 317/23, 307/297: 317/33: 323/22, 323/38
[51] Int. Cl. .................................................. H02h 5/00, G05f 1/58
[50] Field of Search .......................................... 323/(Ter-matrex), 4, 9, 16—22, 38; 317/22, 23, 33VR; 307/297

[56] References Cited
UNITED STATES PATENTS

| | | | |
|---|---|---|---|
| 3,086,163 | 4/1963 | Francois | 323/22(T) |
| 3,122,697 | 2/1964 | Kaunders | 323/22(T) |
| 3,182,246 | 5/1965 | Lloyd | 323/22(T) |
| 3,325,684 | 6/1967 | Berger | 317/23 |

*Primary Examiner*—J. D. Miller
*Assistant Examiner*—G. Goldberg
*Attorney*—Karl F. Ross

ABSTRACT: The voltage developed across a partly capacitive load L is stabilized by a transistor $Ts_1$, connected in series with the load, which has a feedback loop including an amplifier A receiving the output of a comparator S matching the load voltage against a fixed reference voltage. Upon cut-in, the feedback amplifier and the series transistor are blocked and a bypass G supplies a trickle current $I_u$ which, as the load voltage $V_u$ builds up to a relatively low first level $V_4$, unblocks the series transistor via a threshold network $S_4$ whereupon normal load current begins to flow and, as the load voltage reaches a higher second level $V_2$, the feedback amplifier is activated through another threshold network $S_2$ to initiate voltage regulation. If, on overload or short circuit, the load voltage temporarily drops below its normal level $V_1$, a current-limiting network $S_1$ blocks the series transistor; a sustained voltage reduction below the second level $V_2$ deactivates the feedback amplifier, resumption of normal operation with removal of the overload being delayed by a storage circuit M having a time constant greater than that of the load. A further threshold network $S_3$ disconnects the bypass under normal operating conditions.

Augusto Rimondini
Primo Foresti
Inventors.

BY

Karl F. Ross
Attorney

Augusto Rimondini
Primo Foresti
Inventors.
BY
Karl G. Ross
Attorney

VOLTAGE STABILIZER WITH OVERLOAD PROTECTION AND AUTOMATIC RESTORATION

Our present invention relates to a voltage stabilizer to be used in conjunction with a variable load under conditions giving rise to possible overloads or short circuits.

Such voltage stabilizers generally include a dynamic resistance, such as the emitter/collector circuit of a transistor, connected in series with the load and provided with a feedback loop which responds to the output voltage developed across the load so as to vary the conductance of the transistor or equivalent resistance means in a manner tending to hold the output voltage constant. Upon a decrease in the effective load resistance, this type of series regulator is therefore traversed by an increased current which, in the case of a sensitive electronic device such as a transistor, may ultimately lead to its destruction if the load resistance drops to an inordinately low value.

Various protective circuits are known for preventing such overloading of a series regulator either by inhibiting its voltage-stabilizing action or by effectively disconnecting the regulator whenever the load current begins to rise above its permissible upper limit. These prior systems, however, generally suffer from a variety of drawbacks such as excessive energy dissipation, complexity of circuitry and/or inability to return to normal operation without manual resetting upon removal of the overload or short circuit condition.

The broad object of our present invention, therefore, is to provide a voltage stabilizer of the character referred to in which these disadvantages are avoided.

A more specific object of our invention is to provide means in such system for automatically restoring the normal function of the regulator promptly upon reestablishment of at least a near-normal load resistance in its output circuit.

A further object of our invention is to provide a voltage stabilizer of this type which discriminates between slight overloads, on the one hand, and sustained conditions of abnormal load, on the other hand, allowing an immediate restoration of regulation upon normalization of the load in the first case while introducing a certain delay in the second instance so as to prevent instability.

It is also an object of our invention to provide a starting circuit which, upon initial cut-in or upon resetting of the regulator, substantially restricts current consumption until the load voltage approaches the regulation level, such restriction being especially important where the load is partly capacitive and thus would tend to draw a relatively large starting current if the full regulator output were immediately applied to it.

The foregoing objects, and others which will appear hereinafter, are realized in accordance with our invention by the provision of a system of the general type described above including blocking means for deactivating the feedback means of a series regulator, and cutting off current flow through its dynamic resistance means, in response to a dropping of the output voltage of the regulator to a predetermined first level below the normal operating level, such reduction in voltage level being due to the the presence of current-limiting means coupled to the transistor or equivalent dynamic resistance means of the regulator holding its conductivity substantially constant, in a manner non per se, whenever the flow of load current reaches a maximum rated value; the system also includes starting means for restoring the current flow through the regulator whenever, following its deactivation, the output voltage rises to a predetermined second level below the aforementioned first level, the starting means being under the control of delay means inhibiting such restoration for a predetermined period following deactivation by the blocking means.

According to another feature of our invention, the operation of the starting means is facilitated by the provision of generator means, responsive to the application of operating voltage to the input circuit of the regulator, for passing a trickle current through the load in the cutoff condition of the dynamic regulator resistance, this trickle current resulting in the development of a rising output voltage across the load (if the latter has a finite resistance) which rapidly reaches the operating level of the starting circuit to initiate or restore regulation.

More specifically, the trickle-current generator may be a high-resistance bypass path in shunt with the dynamic regulator resistance, this path preferably including electronic switch means such as a Zener diode for interrupting the trickle current as soon as the load voltage approaches its normal level.

These and other features of our invention will be described in greater detail hereinafter with reference to the accompanying drawing in which.

Figure 1:
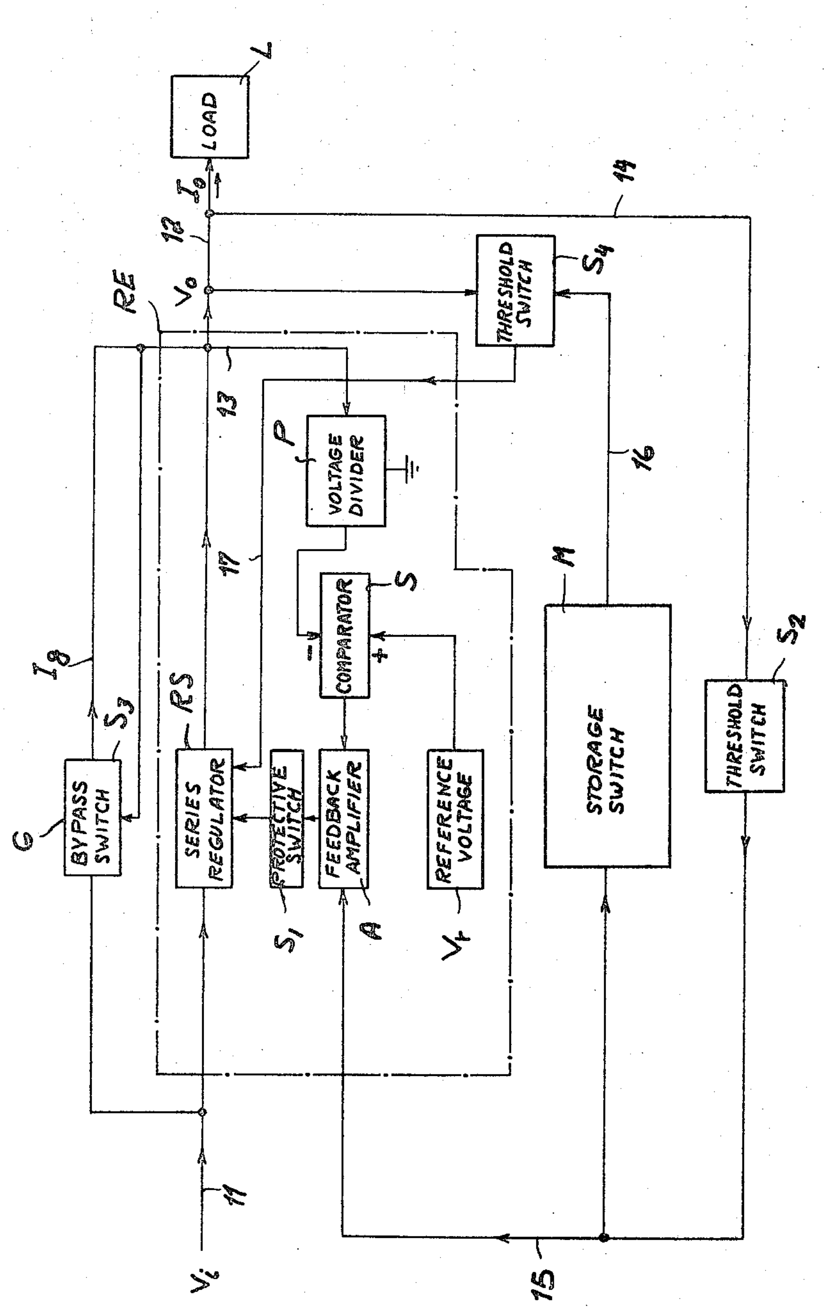
FIG. 1 is a block diagram of a voltage stabilizer according to the invention.

Reference will first be made to FIG. 1 which shows, broadly, a load L to be energized from a source of input voltage $V_i$, a regulating network RE being inserted between the source and the load. An input conductor 11, receiving the voltage $V_i$, is connected to network RE and, in parallel therewith, to a current generator G inserted in a bypass leading to the load L, this generator being associated with an electronic switch $S_3$. The output of generator G is a trickle current $I_g$ which is a small fraction of the rated current $I_o$ normally reaching the load L via an output conductor 12. The magnitude of trickle current $I_g$ may range, for example, between about 0.05 and 0.1 times the normal or mean load current $I_n$.

The output voltage $V_o$ developed on conductor 12 is applied, in parallel, to a voltage divider P and a threshold switch $S_4$, voltage divider P being part of a feedback loop 13 which also includes a comparator S and an amplifier A. Comparator S has an additive first input connected to a source of fixed reference voltage $V_r$ and a subtractive second input energized from a tap on voltage divider P. Amplifier A works through a protective switch $S_1$, serving as a current limiter, into a series regulator RS to control the dynamic resistance thereof.

Another lead 14, branching off output conductor 12, extends to a further threshold switch $S_2$ whose output lead 15 is connected in parallel to a control electrode of amplifier A and to a storage circuit M, the latter having an output lead 16 connected to an inhibiting input of switch $S_4$.

Briefly, the system illustrated in FIG. 1 operates as follows:

When power is first connected to the input circuit of network RE at conductor 11, regulator RS is deactivated so that the direct path to output conductor 12 is interrupted. Operating voltage $V_i$ is, however, also fed to generator G which, since its electronic switch $S_3$ is closed until load voltage $V_o$ reaches a near-normal level, transmits the trickle current $I_g$ to load L so that the voltage on conductor 12 begins to rise. As soon as this voltage reaches a relatively low level (referred to hereinafter as $V_4$, see FIG. 3), threshold switch $S_4$ responds and delivers a starting signal to a lead 17 to unblock the regulator RS. With feedback amplifier A blocked at this stage by the absence of an output from threshold switch $S_2$, the conductance of regulator RS is determined by the potential of lead 17 and is high enough to generate a relatively large load current $I_o$ whereby the voltage $V_o$ rises quickly to a second, more elevated level $V_2$ (FIG. 3) triggering the switch $S_2$ with resultant cut-in of amplifier A. At the same time, the output of switch $S_2$ generates an inhibiting signal for switch $S_4$, this signal being stored in circuit M and applied to the output lead 16 thereof so that lead 17 is deenergized.

Figure 3:
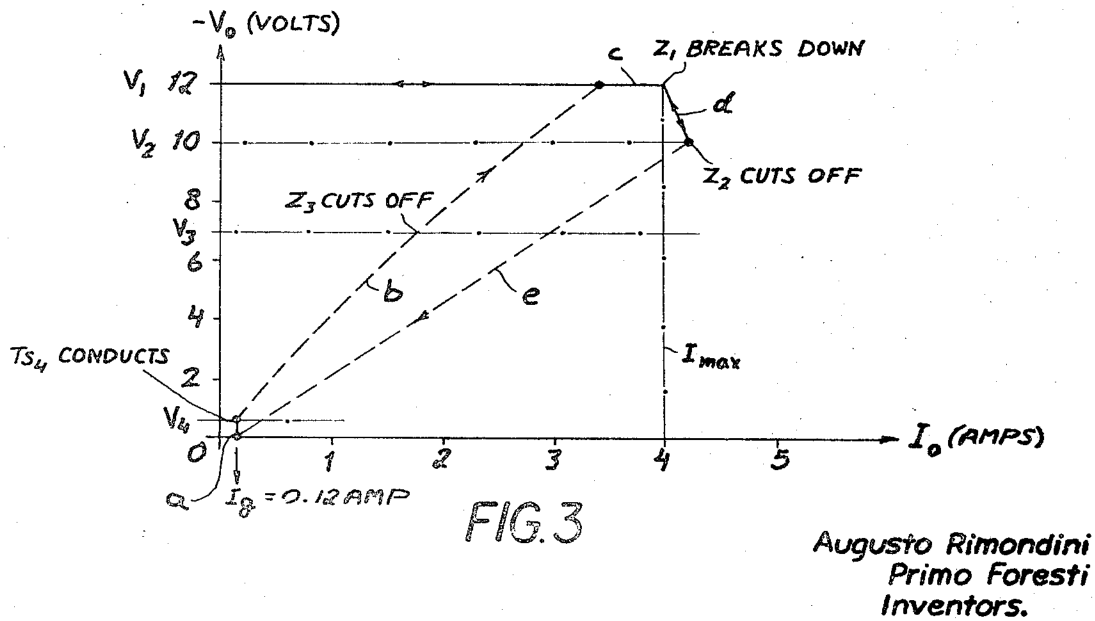
FIG. 3 is a graph serving to explain the operation of the system of FIGS. 1 and 2.

As long as the resistance of load L varies within normal limits, regulator RS compensates this variation by corresponding changes in its own resistance to maintain a substantially constant output voltage $V_o$ at a level $V_1$ (FIG. 3). Auxiliary current generator G is inoperative, its control switch $S_3$ having been opened as the voltage $V_o$ passed an intermediate level $V_3$ (FIG. 3).

If, now, a minor overload condition develops, whereby the current $I_o$ surpasses its rated upper limit, protective switch $S_1$ responds to the accompanying increase in feedback voltage and overrides the output of amplifier A to restrict the further rise in load current. This step is instantly reversible, switch S, becoming inoperative as soon as the voltage difference detected by comparator S is sufficiently reduced to indicate a return of the load current to its normal range.

If, however, the overload reaches major proportions, possibly up to a short circuit, the resultant drop in output voltage $V_o$ opens the switch $S_2$ as soon as this voltage reaches the first threshold $V_2$. This breaks the feedback loop at amplifier A and deactivates the regulator RS inasmuch as switch $S_4$ is temporarily disabled by the inhibiting signal on lead 16. Storage circuit M should have a time constant greater than that of the load L to prevent a reoperation of regulator RS in response to transients developed across a reactive component of a load nearly short-circuited for direct current.

After the inhibiting signal on lead 16 has decayed sufficiently, switch $S_4$ is ready to respond to a rise in load voltage to the second threshold ($V_4$) for reactivating the regulating network RE in the aforedescribed manner.

Details of the system of FIG. 1 will now be described with reference to FIG. 2.

Figure 2:
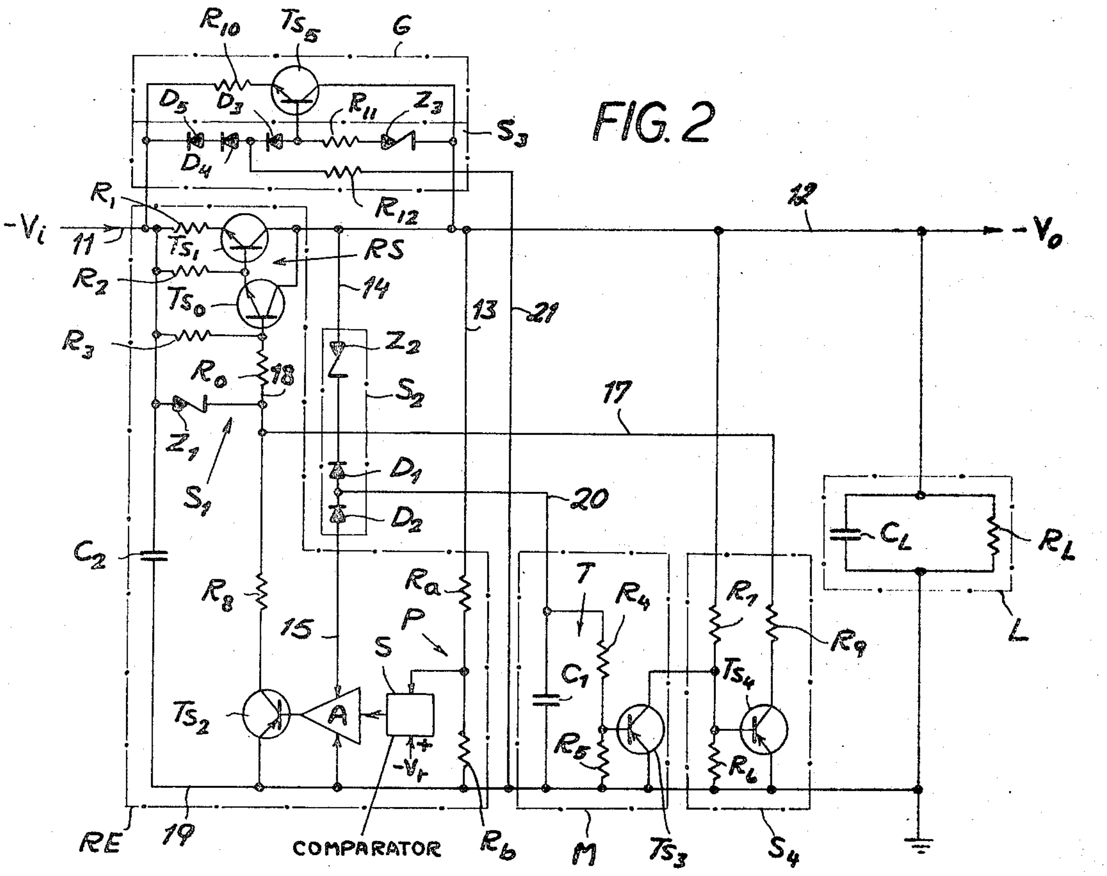
FIG. 2 is a more detailed circuit diagram of the system of FIG. 1.

The circuit arrangement of FIG. 2 is specifically designed, by way of example, to operate on input voltages of negative polarity, here designated $-V_i$, to generate a regulated negative output voltage $-V_o$. The regulator RS of network RE is here shown to comprise a pair of transistor stages $Ts_o$, Tsl connected in cascade, both these transistors being of the NPN type. Protective switch $S_1$ comprises a resistor $R_o$ in the base lead 18 of transistor $Ts_o$, a resistor $R_1$ connected to the emitter of transistor $Ts_1$ in series with input conductor 11, a resistor $R_2$ connected between the same input conductor and the base of transistor $Ts_1$ which is tried to the emitter of transistor $Ts_o$, and a resistor $R_3$ connected between conductor 11 and the base of transistor $Ts_o$, as well as a Zener diode $Z_1$ bridging leads 11 and 18; the latter lead is also joined to the output lead 17 of threshold switch $S_4$ here shown to comprise a PNP transistor $Ts_4$ having its emitter and collector connected between lead 17 and a ground bus bar 19 in series with a resistor $R_9$. A voltage divider consisting of two resistors $R_6$ and $R_7$, whose junction is tied to the base of transistor $Ts_4$, is connected across conductors 12 and 19 in parallel with a capacitor $C_2$. The same junction is connected to the collector of another PNP transistor $Ts_3$ forming part of the storage circuit M whose emitter is grounded at bus bar 19, storage circuit M also comprising a time-constant network T constituted by a condenser $C_1$ in parallel with a voltage divider $R_4$, $R_5$ having a tap connected to the base of transistor $Ts_3$. Network T is inserted between bus bar 19 and the control lead 15 of amplifier A via a lead 20 connected to the junction of two diodes $D_1$ and $D_2$ forming part of the threshold switch $S_2$, this switch also including a Zener diode $Z_2$ in series with diodes $D_1$, $D_2$.

As further shown in FIG. 2, voltage divider P consists of a pair of resistors $R_a$, $R_b$ connected between conductor 12 and bus bar 19, the junction of these resistors being tied to the subtractive input of comparator S whose additive input receives the (here negative) reference voltage $-V_r$. Amplifier A conducts only when its control electrode connected to lead 15 receives negative voltage from conductor 12, i.e. when the load voltage $-V_o$ on this conductor is high enough to break down the Zener diode $Z_2$ as is the case during normal operation. Under these circumstances, the amplified output of comparator S is applied to the base of another PNP transistor $Ts_2$ whose emitter is grounded and whose collector is connected through a resistor $R_8$ to leads 17 and 18.

Auxiliary generator G is shown to comprise an NPN transistor $Ts_5$ is shunt with transistor $Ts_1$, its emitter being connected to conductor 11 through a resistor $R_{10}$ while its collector is tied directly to conductor 12. The electronic control switch of generator G includes a Zener diode $Z_3$ connected, in series with a resistor $R_{11}$, across the base and the collector of transistor $Ts_5$. The base of this transistor is returned to conductor 11 via a low-resistance path here constituted by three diodes $D_3$, $D_4$, $D_5$ connected in series; a biasing lead 21 extends from ground through a resistor $R_{12}$ to the junction of diodes $D_3$ and $D_4$.

The load L is shown to include a resistive branch $R_L$ in parallel with a capacitive branch $C_L$.

The magnitudes of resistors $R_o$, $R_3$, $R_6$, $R_7$ and $R_9$ are so chosen that transistor $Ts_4$ is cut off as long as the absolute value of voltage $-V_o$ is below the threshold level $V_4$. In the Example given in FIG. 3, in which the absolute value of the regulated voltage level $V_1$ is assumed to be 12 volts, threshold $V_4$ is on the order 0.5 volt. The breakdown level $V_2$ of Zener diode $Z_2$ is assumed to be at 10 volts. Normal regulation occurs if the output current $I_o$ ranges between 0 and 4 amps.

Upon the energization of conductor 11 by closure of a switch not shown, connecting this conductor to a source of negative voltage $-V_i$, Zener diode $Z_3$ in switch $S_3$ breaks down since the full input voltage is developed thereacross, conductor 12 being grounded through load resistance $R_L$ and resistors $R_6$ and $R_7$ in parallel therewith. Series resistor $R_{10}$ limits the output current $I_g$ of generator G to a very low value, indicated in FIG. 3 as equal to 0.12 amp. In the presence of a finite load resistance $R_L$, voltage $-V_o$ now rises to level $V_4$ as indicated at *a* in FIG. 3, thus opening the switch $S_4$ to energize the lead 17 with resultant activation of transistors $Ts_o$, $Ts_1$ whereby a low-impedence path is created between conductors 11 and 12. The resulting rise in load current $I_o$, driving the transistor $Ts_4$ toward saturation, rapidly increases the load voltage as indicated at *b* in FIG. 3. As this voltage traverses the threshold $V_3$, Zener diode $Z_3$ cuts off so that the flow of trickle current $I_g$ stops. At the higher threshold $V_2$, Zener diode $Z_2$ breaks down whereupon the further rise in load voltage $-V_o$ is controlled by the amplifier A while the starting signal on lead 17 is suppressed by the buildup of a negative charge on condenser $C_1$ which energizes the transistor $Ts_3$, thereby cutting off the transistor $Ts_4$.

Branch *c* of the graph of FIG 3 coincides with the regulation level $V_1$ which is maintained as long as the fluctuations of load L are not so substantial as to let the current $I_o$ on conductor 12 exceed its rated upper limit $I_{max}$. If, however, the load resistance $R_L$ decreases sufficiently to generate a feedback voltage on lead 18 of such a magnitude as to increase the conductance of transistor $Ts_1$ to its permissible limit, the Zener diode $Z_1$ breaks down to stabilize the feedback voltage whereby only a very slight additional increase in load current (due to a further reduction in load resistance) can occur as indicated at *d* in FIG. 3. Branch *d* of the graph of FIG. 3 represents the reversible region of current limitation with instant restoration of regulation as soon as the feedback voltage is sufficiently reduced to cut off the Zener diode $Z_1$.

A further reduction in load resistance beyond the reversible range causes the voltage $-V_o$ to drop below the level $V_2$ so that Zener diode $Z_2$ ceases to conduct, amplifier A is blocked and transistors $Ts_o$, $Ts_1$ are cut off. The negative potential on condenser $C_1$ maintains the conductivity of amplifier A only for a very short period, the condenser then beginning to discharge through the circuit formed by resistors $R_4$, $R_5$ and by the base/emitter resistance of transistor $Ts_3$. The time constant of this discharge circuit is considerably higher than that of the charging circuit of the condenser, represented by Zener diode $Z_2$ and ordinary diode $D_1$, and should be greater than the time constant or the load circuit $C_L$, $R_L$ for the reasons explained above. The small forward resistance of diode $D_2$ is sufficient to maintain the condenser potential at a value (upwards of, say, −1 volt) saturating the transistor $Ts_3$ so that transistor $Ts_4$ remains nonconductive for the desired delay period; this diode resistance, on the other hand, is not so high as to prevent the activation of amplifier A before transistor $Ts_4$ cuts off upon reinitiation of regulation, owing to the finite time constant of the charging circuit of condenser $C_1$.

Thus, as illustrated at *e* in FIG. 3, the output current $I_o$ rapidly decays upon the blocking of the feedback by switch $S_2$, yet a residual current flow $I_g$ remains on account of the reoperation of generator G as the voltage $V_o$ drops below level $V_3$. With removal of the short circuit, and upon the complete discharge of condenser $C_1$, the system then returns to its normal operation as previously described.

We claim:

1. A voltage stabilizer comprising:
   an input circuit connectable across a source of operating voltage;
   an output circuit containing a load;
   dynamic resistance means connected in series between said input and output circuits and provided with feedback means responsive to an output voltage developed across said load for varying the magnitude of said dynamic resistance means in a sense tending to hold said output voltage substantially constant at a normal operating level;
   blocking means connected to said output circuit for deactivating said feedback means and cutting off current flow through said dynamic resistance means in response to said output voltage dropping to a predetermined first level below said operating level;
   starting means connected to said output circuit for restoring current flow through said dynamic resistance means in response to said output voltage rising to a predetermined second level below said first level while maintaining said feedback means inactive until attainment of said first level;
   delay means controlled by said blocking means for maintaining said starting means inoperative for a predetermined period following cutoff of current flow through said dynamic resistance means; and
   current-limiting means coupled to said dynamic resistance means for holding the conductivity thereof substantially constant in response to said current flow reaching a maximum rated value.

2. A voltage stabilizer as defined in claim 1, further comprising generator means responsive to said operating voltage for passing a trickle current through said load in the cutoff condition of said dynamic resistance means, thereby developing across said load an output voltage rising to said second level in the presence of a finite load resistance.

3. A voltage stabilizer as defined in claim 2 wherein said generator means comprises a high-resistance bypass path in shunt with said dynamic resistance means.

4. A voltage stabilizer as defined in claim 3 wherein said bypass path includes electronic switch means responsive to an output voltage higher than said second level for interrupting said trickle current.

5. A voltage stabilizer as defined in claim 1 wherein said delay means comprises a storage condenser connected to be charged by said output voltage in the active conditions of said feedback means, said condenser being provided with a charging circuit of relatively low time constant and with a discharging circuit of relatively high time constant.

6. A voltage stabilizer as defined in claim 5 wherein said load is partly reactive, said relatively high time constant being greater than the maximum time constant of said load.

7. A voltage stabilizer as defined in claim 5 wherein said feedback means comprises an amplifier with a control electrode connected to said output circuit for energization by said output voltage, said blocking means including a Zener diode inserted between said control electrode and said output circuit, said charging circuit being connected to said Zener diode in parallel with said amplifier.

8. A voltage stabilizer as defined in claim 7 where said starting means comprises a first transistor without input means connected across said condenser, said dynamic resistance means comprising a second transistor with parallel input connections to the outputs of said amplifier and of said first transistor.

9. A voltage stabilizer as defined in claim 8 wherein said current-limiting means comprises a further Zener diode connected across the input of said second transistor.

10. A voltage stabilizer as defined in claim 7 wherein said feedback means further comprises a voltage divider connected across said output circuit, a source of reference voltage, and comparison means with two inputs respectively connected to a tap on said voltage divider and to said source of reference voltage, said comparison means having an output connected to an input of said amplifier.